Patented July 3, 1951

2,559,153

UNITED STATES PATENT OFFICE 2,559,153

SEPARATION OF STEROLS FROM MIXTURES

Johannes Thomas Hackmann, Amsterdam, Netherlands, assignor to Shell Development Company, San Francisco, Calif., a corporation of Delaware No Drawing. Application October 28, 1947, Serial No. 782,686. In the Netherlands January 9, 1947

7 Claims. (Cl. 260—397.2)

This invention relates to a process for the separation of certain steroids from mixtures containing them, and to complexes and products so prepared. More particularly, it is concerned with the separation of desired sterols, such as cholesterol, from natural products, for example, wool grease.

The most common sources of cholesterol have been spinal cords and brain tissue because the process of extraction by solvents and crystalization was relatively simple, in that substantially no impurities occurred which interfered with the process of crystallization. Lately other methods have been proposed for the separation of cholesterol and sterols from natural products such as lanolin, including the use of oxalic acid or metal salts which preferentially form addition compounds with cholesterol. While these later methods are suitable for the preparation of crude products, their use in the preparation of highly purified materials is not regarded as satisfactory. The separation of other steroids such as the bile acids, hormones, cardiac poisons and saponins from their mixtures with other naturally occurring materials presents similar problems, both technical and economic.

It is an object of this invention to provide a novel process for the separation of certain steroids from mixtures containing them. It is a particular object of this invention to provide an improved process for the isolation of cholesterol from natural prducts such as wool grease, nerve tissue, or fats. It is another object of this invention to provide novel complexes which may be useful in pharmaceutical and biological applications. Other objects will become apparent during the following discussion.

In its broad aspect, this invention contemplates recovering mono-hydroxysterols from mixtures containing them by contacting the latter with urea, its hydrochloride salt, or mixtures of such agents. Still in accordance with this invention, the complexes so formed comprise crystalline materials which may be used without further modification or which may be readily decomposed to yield a steroid and the original complex-forming agent.

The process of the present invention is applicable to the fractionation of mixtures of steroids and to the separation of mono-hydroxysterols from mixtures containing other organic or inorganic compounds which are substantially inactive toward the complex-forming agent under the conditions employed. The preferred group of steroids to which the present process may be applied comprises the mono-hydroxy sterols and particularly cholesterol as well as natural products containing these compounds. Typical sterols which may be treated according to the present invention include farnesol, colocynth sterol, withaniol, homotaraxasterol, fongisterol, bombisterol, isocholesterol, ergosterol, cholesterol, stigmasterol, sitosterol, phytosterol, coprosterol, hippocoprosterol and 7-dehydrocholestrol as well as its antirachitically activated derivatives.

The complex-forming agents such as urea, thiourea, selenourea or tellurourea, may be used as solids or as liquids or solutions dependent upon the conditions of the fractionation, the products being treated and the type of fractionation desired. Preferably a liquid system is employed wherein a highly concentrated solution of the complex-forming agent is intimately contacted with the mixture containing the sterols or other steroids. Another suitable system comprises the passage of a liquefied or dissolved mixture of steroids through a bed containing the solid complex-forming agent or through a tower containing a solution of the same. The process may be carried out batchwise or continuously but the latter is preferred.

The temperature at which the treatment is conducted will depend upon the other conditions employed but preferably should be between about $-20°$ C. and $100°$ C. Other temperatures may be employed in special cases. If the mixture contains a number of mono-hydroxysterols which are reactive toward the complex-forming agent, the conditions of contacting may be adjusted so that one sterol may be removed before another commences to crystallize. This may be effected by stepwise temperature adjustments.

In order to facilitate the crystallization of a desired complex certain solvents may be employed which are preferably substantially inert toward any other components of the reaction mixture. When treating lanolin or wool fat alcohols with the complex-forming agents suitable solvents include acetone, pentane and naphtha fractions. Care must be taken to choose solvents which will not form an appreciable amount of complexes with the agents. For example, urea forms complexes with hydrocarbons having substantially straight-chains; therefore, a suitable solvent for use with urea is iso-octane.

In carrying out the process of the present invention it has been found that certain mixtures do not readily form a crystalline complex by simply contacting the mixture with a complex-forming agent. In these cases, either before or after the complex has been formed, the reaction mixture may be mixed with a precipitant calculated to precipitate either the complexes or the inert fractions of the mixture. Suitable precipitants include iso-octane, especially when urea is the complex-forming agent employed.

The complexes formed by the process of the present invention appear to be molecular addition compounds held together presumably by some form of hydrogen bonding, although this has not been definitely ascertained. In many cases the addition compound or complex contains one molecule of the agent to every molecule of the mono-hydroxysterol. However, when the agent is used in the form of the hydrochloride, other addition products are also frequently found to form in which the ratio of steriod to agent is approximately two to one. These crystalline materials have definite melting points and are readily decomposed by the application thereto of heat or of aqueous media. A preferred method for their decomposition comprises heating the complex in the presence of water. If the sterol is water-insoluble, two phases form, one of which is the sterol, the other comprising an aqueous solution of the agent regenerated from the complex. Steam distillation may be employed if the sterols are stable enough to resist high temperatures. The application of a dry hot gas, such as nitrogen, or vapors of organic compounds, such as alcohols, may be employed in the destruction of the complexes. The following examples are presented to illustrate the process of the present invention:

Example I 500 parts wool fat alcohols with a cholesterol content of 28.7% are heated to about 90° C. for 30 minutes with 13 parts solid urea while stirring vigorously. After cooling down to about 30° C. the reaction mixture is poured into 2500 parts iso-octane with agitation. The precipitated addition product thus formed is centrifuged off and washed with 1000 parts iso-octane. This precipitate, the nitrogen content of which is 3.4%, is subsequently treated with 250 parts water, as a result of which the complex is decomposed into its constituents, the urea dissolving in the water and cholesterol separating as a second phase. The product so obtained comprised 72.6% cholesterol.

Example II 750 parts of a solution of 3.5% cholesterol in acetone is mixed with a saturated alcoholic solution of 3.5 parts urea. An addition product, containing equal molecular proportions of cholesterol and urea crystallizes from the mixture after standing for an hour at room temperature. This complex had a melting point of 144° C.

Example III

The process of Example II was repeated using urea hydrochloride in place of urea. The complex which was formed contained 2 molecules of cholesterol for each molecule of urea hydrochloride and melted at 136° C.

I claim as my invention:

1. Process for the separation of cholesterol from natural mixtures containing the same, comprising converting the cholesterol into a crystalline molecular urea complex and separating said complex from the other components of the mixture.

2. A method of separating stigmasterol from a mixture containing the same which comprises contacting said mixture with urea to form a crystalline molecular complex of urea with stigmasterol, forming said complex and separating said complex from the resulting admixture.

3. A method of separating a mono-hydroxy sterol from a mixture containing the same which comprises contacting said mixture with urea to form a crystalline molecular complex of urea with said mono-hydroxysterol, forming said complex and separating said complex from the resulting admixture.

4. A method of separating a mono-hydroxy sterol from a mixture containing the same which comprises contacting said mixture with urea hydrochloride to form a crystalline molecular complex of urea with said mono-hydroxy sterol, forming said complex and separating the same from the resulting admixture.

5. A method of separating a mono-hydroxy sterol from a mixture containing the same which comprises contacting said mixture with an agent of the group consisting of urea and urea hydrochloride to form a crystalline molecular complex of said agent with the mono-hydroxy sterol, forming said complex and separating the same from the resulting admixture.

6. The process for the separation of cholesterol from natural mixtures containing the same comprising converting the cholesterol into a crystalline molecular complex with urea hydrochloride and separating said complex from the other components of the mixture.

7. The process for the separation of cholesterol from wool fat alcohols containing the same comprising converting the cholesterol into a crystalline molecular complex with urea and separating said complex from the remaining wool fat alcohols.

JOHANNES THOMAS HACKMANN.

REFERENCES CITED

The following references are of record in the file of this patent:

UNITED STATES PATENTS

| Number | Name | Date |
| --- | --- | --- |
| 2,300,134 | Priewe | Oct. 27, 1942 |
| 2,362,605 | Yoder | Nov. 14, 1944 |

OTHER REFERENCES

Gaubert, Compt. Rend. 149, 608–610 (1909).